United States Patent
Hiremath et al.

(10) Patent No.: US 8,867,421 B2
(45) Date of Patent: Oct. 21, 2014

(54) CORRECTION OF CLOCK ERRORS IN A WIRELESS STATION TO ENABLE REDUCTION OF POWER CONSUMPTION

(75) Inventors: Indudharswamy G Hiremath, Bangalore (IN); Venu Madhava Rao Kosuri, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 436 days.

(21) Appl. No.: 13/444,850

(22) Filed: Apr. 12, 2012

(65) Prior Publication Data

US 2013/0272180 A1    Oct. 17, 2013

(51) Int. Cl.
   *G08C 17/00*    (2006.01)

(52) U.S. Cl.
   USPC .......................................................... 370/311

(58) Field of Classification Search
   CPC .................................................... H04W 52/029
   USPC .......................................................... 370/311
   See application file for complete search history.

(56) References Cited

U.S. PATENT DOCUMENTS

| | | | |
|---|---|---|---|
| 5,910,944 A * | 6/1999 | Callicotte et al. | 370/311 |
| 5,995,820 A * | 11/1999 | Young et al. | 455/343.1 |
| 6,069,887 A | 5/2000 | Geiger et al. | |
| 6,333,939 B1 * | 12/2001 | Butler et al. | 370/503 |
| 7,072,432 B2 | 7/2006 | Belcea | |
| 7,567,544 B2 | 7/2009 | Myles et al. | |
| 8,005,515 B1 * | 8/2011 | Chhabra et al. | 455/574 |
| 2003/0043766 A1 * | 3/2003 | McDonough et al. | 370/335 |
| 2004/0203474 A1 * | 10/2004 | Miller et al. | 455/69 |
| 2005/0136882 A1 | 6/2005 | Boulton | |
| 2005/0195772 A1 * | 9/2005 | Nishikawa et al. | 370/337 |
| 2006/0056322 A1 | 3/2006 | Simpson et al. | |
| 2009/0161687 A1 * | 6/2009 | Yu et al. | 370/436 |
| 2010/0061305 A1 * | 3/2010 | Kubo | 370/328 |
| 2010/0303185 A1 * | 12/2010 | Haartsen | 375/362 |
| 2011/0176464 A1 | 7/2011 | Warner et al. | |
| 2012/0057620 A1 * | 3/2012 | Yamamoto et al. | 375/211 |
| 2013/0077546 A1 * | 3/2013 | Liu et al. | 370/311 |

OTHER PUBLICATIONS

"Dong Zhou and Ten-Hwang Lai", "Analysis and Implementation of Scalable Clock Synchronization Protocols in IEEE 802.11 Ad Hoc Networks", Year 2004 IEEE, pp. 255-263.
"Timing Synchronization Function (TSF)", http://en.wikipedia.org/wiki/Timing_Synchronization_Function, Year 12 Dec. 2011, p. 1.

* cited by examiner

*Primary Examiner* — Brandon Renner
*Assistant Examiner* — Faisal Choudhury
(74) *Attorney, Agent, or Firm* — Narendra Reddy Thappeta (57) ABSTRACT

According to an aspect, a wireless station uses a low-frequency clock during sleep intervals and a high-frequency clock during awake intervals. Drift between the low-frequency clock and the high-frequency clock are corrected to enable aligning a wake time instant of the wireless receiver with start of beacon transmissions from an access point, and thereby to reduce power wastage. According to another aspect, errors between the clock of an access point and that of a wireless station are corrected. The wireless station computes an error between the clocks, and extrapolates the error for a sleep interval to compute a wake-up time instant. The correction and extrapolation are performed in every awake interval. Again, undesired power consumption in the wireless station is thereby reduced.

10 Claims, 10 Drawing Sheets

CORRECTION OF CLOCK ERRORS IN A WIRELESS STATION TO ENABLE REDUCTION OF POWER CONSUMPTION

BACKGROUND

1. Technical Field

Embodiments of the present disclosure relate generally to wireless devices, and more specifically to techniques for correction of clock errors in wireless devices to enable reduction of power consumption.

2. Related Art

A wireless network generally includes two or more wireless devices (wireless stations) that communicate with each other over a wireless medium. A wireless local area network (WLAN) designed to operate according to IEEE 802.11 standard(s) is an example of a wireless network. One or both of a pair of wireless stations that communicate with each other may be designed to be operable in a low-power (or sleep) mode either periodically or sporadically. As an example, in an infrastructure basic service set (BSS) according to IEEE 802.11, a wireless station and another wireless device termed an access point may communicate with each other.

The wireless station may only periodically (or sporadically) be "fully awake" to receive communication (e.g., beacons) from the AP, being in a low-power/power-down mode otherwise. Typically, the radio portion (containing receive and transmit signal processing chains) is set to the low-power mode, since the radio portion is usually the highest power-consuming portion of a wireless station. Additionally, at least some portions of the rest of the wireless station (e.g., some portions of a processor and some peripherals in the wireless station) may also be set to a low-power mode.

Each of the AP and the wireless station maintains time using corresponding clock circuitry. However, the clocks of the AP and the wireless station may not be perfectly synchronized or aligned with respect to each other, and in general may not keep perfect synchronized time. Due to such clock errors (deviations from synchronization), the power-up instants of the radio portion (and/or any other portion set to low-power mode) of the wireless station may not coincide perfectly with a desired (ideal) wake-up time instant. Instead, the wireless device may wake-up either too early or too late with respect to start of transmission instants of communication (e.g., beacons) from the AP. In either scenario, undesired power consumption occurs in the wireless station.

Several embodiments of the present disclosure are directed to correction of clock errors in a wireless station, and thereby to enable reduction of power consumption in the wireless station.

BRIEF DESCRIPTION OF THE VIEWS OF DRAWINGS

Example embodiments of the present invention will be described with reference to the accompanying drawings briefly described below.

DETAILED DESCRIPTION

1. Overview

According to an aspect, a wireless station uses a high-frequency clock to maintain time in awake intervals, but uses a low-frequency clock to maintain time when in a low-power mode. In the low-power mode, the wireless station is designed to set one or more circuit portions contained in the wireless station in a low-power mode. The wireless station is operative in awake intervals to receive beacons from an access point (AP). The wireless station determines a corrected count value designed to indicate the start of the awake interval. The wireless station obtains the corrected count value by adjusting an uncorrected count value by an error value specifying an error between the low-frequency clock and the high-frequency clock. The wireless station powers-ON the one or more circuit portions at a time instant obtained based on the corrected count value.

According to another aspect, errors between a clock used by the wireless station and the clock used by an access point are corrected. The wireless station receives, in a previous awake interval of the wireless station, a first time value from the access point (AP). The wireless station computes an error between the first time value and a second time value, the second time value representing a value of time obtained using a local clock of the wireless station at the time instant of the computing. The wireless station extrapolates the error for a duration for which the one or more circuit portions is to be in the low-power mode, the extrapolating yielding a wake time instant. The wireless station powers-ON the one or more circuit portions at the wake time instant.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
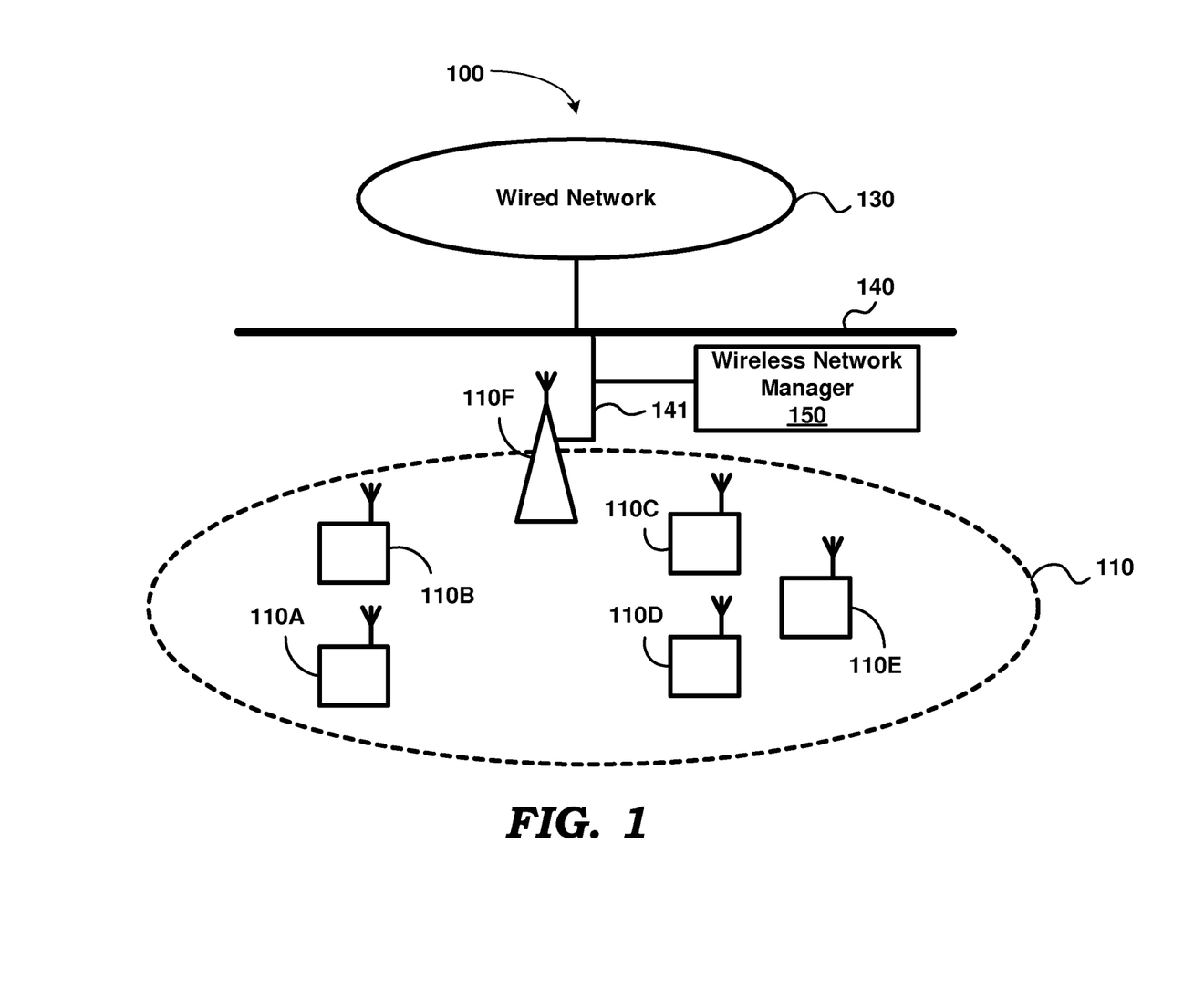
FIG. 1 is a block diagram of an example environment in which several features of the present invention can be implemented.

FIG. 1 is a block diagram illustrating an example environment in which several features of the present invention can be implemented. The example environment is shown containing only representative systems for illustration. However, real-world environments may contain many more systems/components as will be apparent to one skilled in the relevant arts. Further, in the description below, the components and the environment are described as operating consistent with IEEE 802.11 standard(s), merely for illustration. Implementations in other environments are also contemplated to be within the scope and spirit of various aspects of the present disclosure.

System 100 is shown containing wireless stations (also known as clients) 110A-110E, access point (AP) 110F, wired network 130, wired network backbone 140 and wireless network manager 150. Block 110 represents a basic service set (BSS) consistent with the 802.11 standard(s). Other environments may include more than one BSS, with the BSSs being interconnected to form an extended service set (ESS) consistent with IEEE 802.11 standards. While the description below is provide with respect to an infrastructure BSS, several embodiments of the present disclosure can be implemented in an independent BSS (IBSS) as well. As is well-known in the relevant arts, an IBSS is an ad-hoc network and does not contain access points.

AP 110F is connected by a wired medium (141) to wired network backbone 140 and thus to wired network 130. Each of clients 110A-110E may communicate with AP 110F (as well as with each other) wirelessly according to any of the family of IEEE 802.11 protocols (including as specified in IEEE 802.11a, 802.11b, 802.11g and 802.11n) and thereby with wired network 130. Wired network 130 may represent the internet, also known as the World Wide Web. One or more of wireless stations (stations) 110A-110E may correspond, for example, to a laptop computer, smart phone, or a wireless sensor.

Wireless network manager 150 transmits configuration and control messages to AP 110F. Some of the configuration and control messages may be meant for stations 110A-110E. Accordingly, AP 110F forwards the corresponding configuration and control messages meant for the stations, either as unicast messages (directed to a specific one of clients 110A-110E) or as broadcast messages. Although shown separate from AP 110F, the features of wireless network manager 150 may instead be integrated within AP 110F in some embodiments.

Wireless network manager 150 may additionally be designed to operate as a controller of BSS 110, and issue network commands to and receive data from one or more of stations 110A-110E, and may thus operate to provide desired features such as building or plant automation, based on the specific environment in which the components of FIG. 1 are deployed. The data received from clients 110A-110E may represent measured values of desired parameters such as temperature, pressure, humidity, etc. In other embodiments, stations 110A-110E may be deployed for purposes other than for providing features such as plant automation. For example, one or more of clients may represent a computing device such as a laptop, and may transfer data with other devices in BSS 110 or wired network 130 based on the requirements of the user of the laptop.

One or more of clients 110A-110E may be designed to operate in a 'power-save' mode. For example, in the context of IEEE 802.11 operation, a station (assumed to be client 110A herein for simplicity) may operate in the standard Power Save Poll Mode (PSPM, or power-save mode, in general). Upon joining BSS 110, station 110A communicates to AP 110F that it (station 110A) is to operate in PSPM. In PSPM, client 110A periodically "wakes up" (i.e., powers-ON for full functionality) from a power-OFF state to transmit data to, or receive data from, AP 110F or the other clients of BSS 110. The power-save or low-power mode may correspond to setting one or more portions (e.g., radio portion) of station 110A in a low-power mode. Low-power mode/state or power-save mode/state (or sleep mode/state) as used herein means that one or more circuit portions of a device (wireless station in this context) is either switched off completely, or set in a standby mode in which minimal power is consumed, but in which normal operation of the corresponding circuit portion is not possible. Similarly, power-ON (or powering-ON or waking-up) refers to application of full operational power to one or more circuit portions, such that normal operation of the wireless station is rendered possible.

Figure 2A:
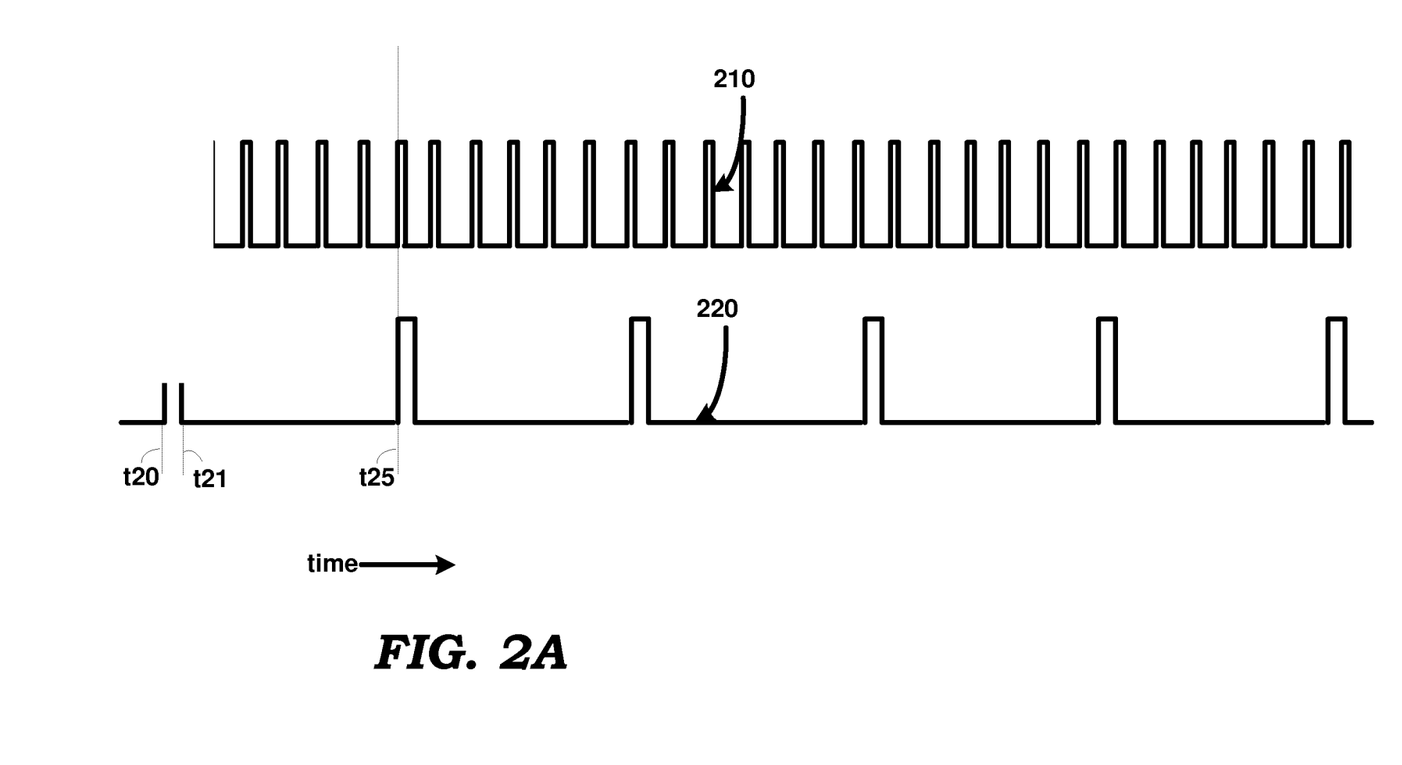
FIG. 2A is a diagram showing an example waveform illustrating periodic power-ON and power-OFF sequences of a wireless station.

Waveform 220 of FIG. 2A is an example waveform used to illustrate periodic power-ON and power-OFF sequences of client 110A in PSPM. Interval t20-t25 represents the interval between the start instants of successive power-ON (awake or listen) states/interval. Interval t20-t21 is the duration for which client 110A is in the power-ON state in each awake interval, and may be different for different awake intervals depending on the volume of data to be transmitted or received by station 110A, or other considerations. Typically, in awake intervals, station 110A receives at least a beacon transmitted by AP 110F.

Beacon frames refer to frames which are periodically broadcast (i.e., addressing all devices in the BSS) by an AP for the purpose of communicating various types of information including management information and potentially data directed to specific ones of the wireless stations. IEEE 802.11 standard also defines beacon frames for the corresponding environments, and are periodically transmitted by AP 110F in the environment of FIG. 1. Beacon frames generally specify information about the corresponding wireless network (BSS 110 in FIG. 1). Beacon frames are transmitted periodically to announce the presence of a Wireless LAN network. Beacon frames are transmitted by the Access Point (AP) in an infrastructure BSS. In IBSS networks, beacon frame generation is distributed among the stations in the IBSS. Some of the information contained in beacon frames includes timestamp (for synchronization of time among all the stations in a BSS), beacon frame interval (time interval between beacon frames), capability information (specifying capabilities of the wireless network), supported data rates, etc. In FIG. 2A, waveform 210 represents periodic beacon transmissions by AP 110F.

Wireless station (station) 110A synchronizes its local clock with respect to the clock of the AP, based on the time stamp contained in a beacon frame. Client 110A, when operating in power-save mode, wake-up period (interval between two successive awake intervals) equal to some multiple (K) of the beacon frame interval, and aligns its power-ON durations (such as in interval t20-t21 in FIG. 2) with the beacon frames.

A problem with precisely aligning the wake-up time instant with the start of the beacon frames occurs when time as maintained by wireless station 110A is not in synchronism with (i.e., is not equal to) time as maintained by AP 110F i.e., when there exists an error between the clock of AP 110F and the clock of station 110A. The misalignment of the clocks may result in station 110A waking up earlier than desired or later than desired, as illustrated in FIG. 2B.

Figure 2B:
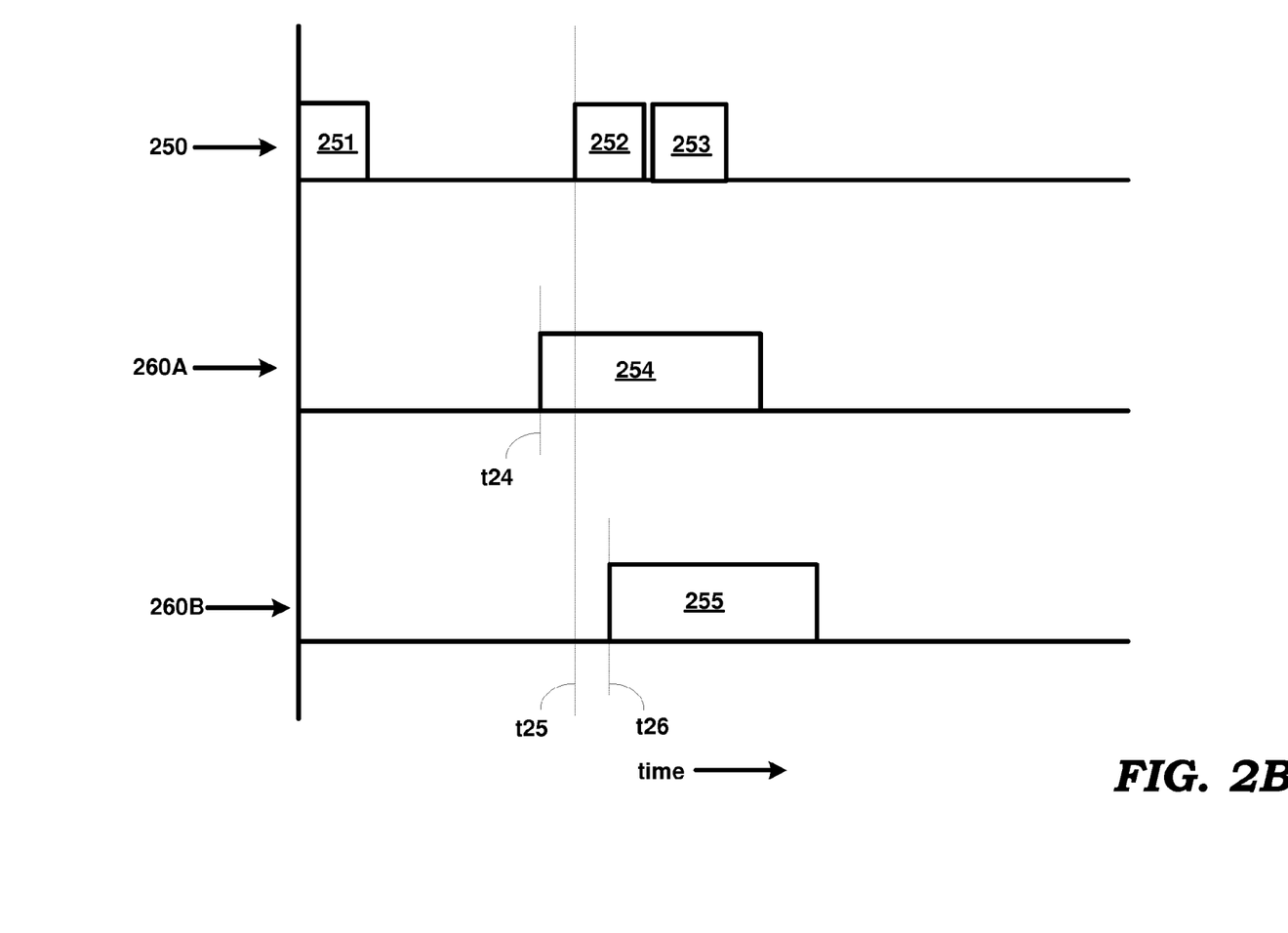
FIG. 2B is a diagram illustrating an example scenario of power wastage in a wireless station due to errors between a high-frequency clock and a low-frequency clock in the wireless station.

Waveform 250 of FIG. 2B represents transmissions by AP 110F. Waveform portions 251 and 252 represent two successive beacon transmissions. Waveform portion 253 represents data specifically destined for station 110A. Waveform 260A illustrates a scenario in which the clock of station 110A is faster than that of AP 110F, with station 110A thereby waking up too early (at t24), i.e., earlier than the ideal wake-up instant of t25 (when the beacon transmission commences). Time instant t25 of FIG. 2B is the same as time instant t25 of FIG. 2A. Waveform portion 254 represents the fully-powered up state of station 110A. It can be observed that power is unnecessarily wasted by station 110A being awake in interval t24-t25. Waveform 260B illustrates a scenario in which the clock of station 110A is slower than that of AP 110F, with station 110A thereby waking up too late, i.e., later than the ideal wake-up instant of t25. Waveform portion 255 represents the fully-powered up state of station 110A. Station 110A could potentially miss receiving beacon 252. In such scenarios, station 110A may be designed to keep fully awake till a next beacon is received, thereby again resulting in unnecessary power consumption.

In an embodiment, station 110A employs a high frequency, low-drift/high accuracy clock to maintain time during 'awake' intervals/durations, i.e., when station 110A is fully powered up and fully operational as represented by waveform portions 254 or 255. However, between 'awake' intervals, i.e., in intervals in which one or more portions such as the radio portion of station 110A is in low-power mode, station 110A employs a low-frequency, low-accuracy clock to maintain time. The use of the low frequency clock helps in reducing power consumption during the low-power mode (also referred to as sleep mode herein). Thus, for example, time in wireless station 110A is maintained using the high-frequency clock in interval t20-t21 of FIG. 2A, but using the low-frequency clock in interval t21-t25.

Wireless station 110A stores, in a non-volatile memory, the time stamp (time value obtained using the high-frequency clock) just prior to entering the sleep mode (e.g., at t21). On waking-up from the sleep mode (or just prior to wake-up), such as at, or slightly earlier than, time instant t25 (of FIG. 2A), the time elapsed since entering the sleep mode is calculated. Since station 110A uses a low-frequency clock to maintain time in the sleep mode, the elapsed time is computed based on the operation (the time maintained) by the low-frequency clock.

Wireless station 110A adds the elapsed time and the stored time stamp to obtain the 'current' time. The elapsed time, being based on the operation of the low-accuracy, low-frequency clock, may be in error. As a result the current time may also be in error with respect to the time maintained by AP 110F. Consequently, wireless station 110A may wake up too early or too late with respect to the start of beacon transmission by AP 110F, as noted with respect to FIG. 2B, thereby potentially resulting in wasteful power consumption. The manner in which such clock errors and the resulting power wastage are reduced is described next.

3. Correcting Errors Due to Use of a Low-Accuracy Clock

Figure 3A:
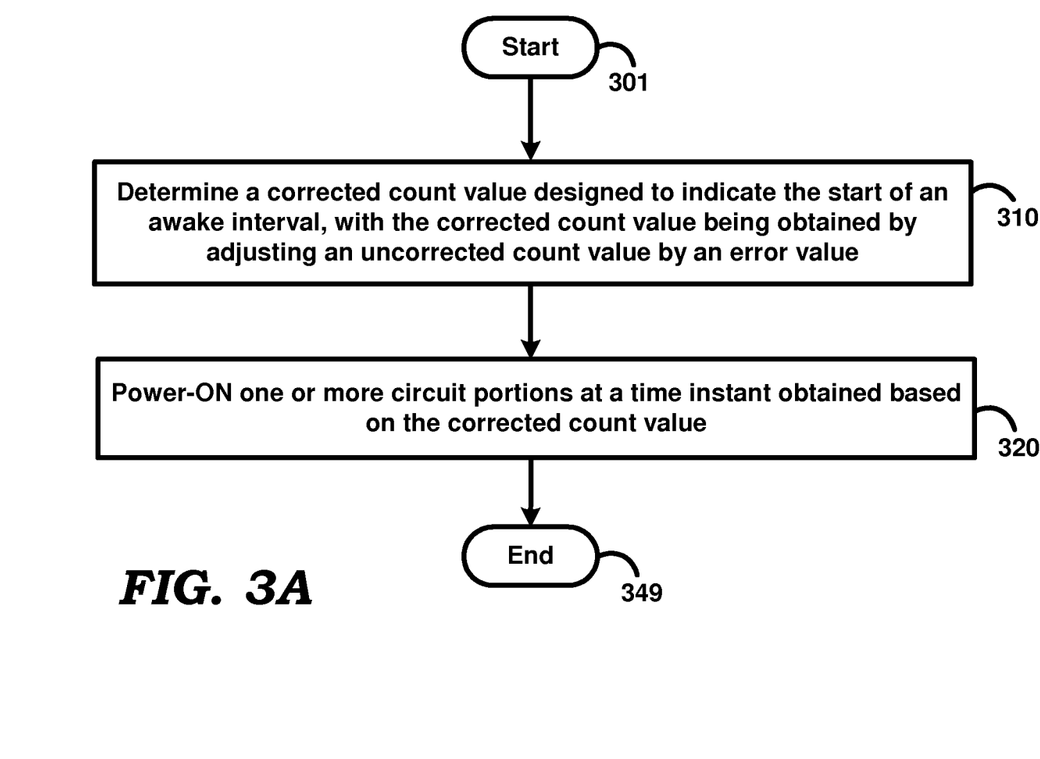
FIG. 3A is a flowchart illustrating the manner in which errors due to use of a low-frequency clock during sleep durations of a wireless station are corrected, in an embodiment.

FIG. 3A is a flowchart illustrating the manner in which errors due to use of a low-frequency clock during sleep durations of a wireless station are corrected, in an embodiment. The flowchart is described with respect to the environment of FIG. 1, and in relation to station 110A, merely for illustration. However, various features described herein can be implemented in other environments (e.g., independent BSS) and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, station 110A determines a corrected count value. The corrected count value is designed to indicate the start of an awake interval. Station 110A obtains the corrected count value by adjusting an uncorrected count value by an error value, the error value specifying an error between the low-frequency clock and the high-frequency clock. As described below in further detail, the error represents a deviation of the actual ratio of frequency of the high frequency clock to the frequency of the low frequency clock, from an expected/ideal ratio. The corrected count value may be computed by station 110A immediately prior to setting one or more circuit portions contained within, to a low-power mode. Control then passes to step 320.

In step 320, station 110A powers-ON one or more circuit portions at a time instant obtained based on the corrected count value. Control then passes to step 399, in which the flowchart ends.

Figure 3B:
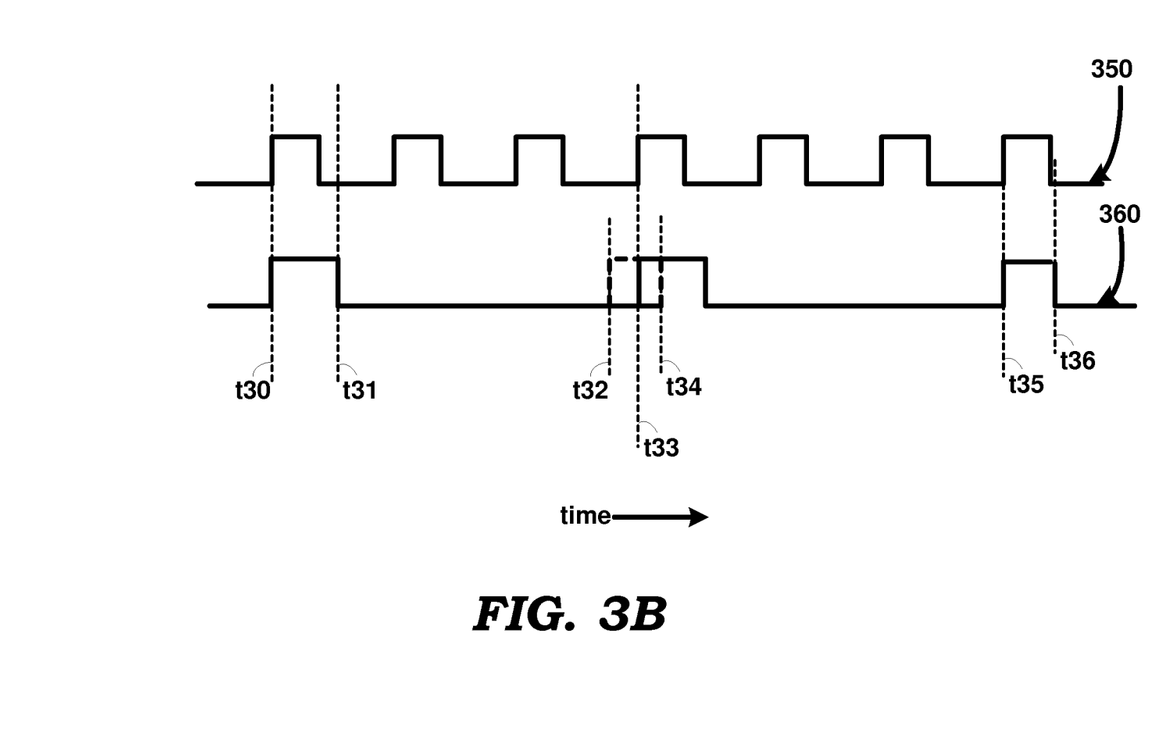
FIG. 3B is an example diagram illustrating the error correction performed in a wireless station in an embodiment.

The operation of the steps of the flowchart of FIG. 3A, as described above, is further illustrated with the example diagram of FIG. 3B. The logic high durations of waveform 350 represent beacon transmissions of AP 110F. The logic high durations of waveform 360 represent awake intervals of station 110A. It is assumed that the clocks of AP 110F and station 110A are perfectly in synchronism to start with, as depicted by the start of awake interval at t30. Immediately prior to time instant t31 (when station 110A sets corresponding portions, including its radio portion, in low-power mode), station 110A stores the 'current' time in non-volatile storage. The current time may be obtained from a corresponding timekeeping circuitry (e.g., a real-time clock (RTC)), operated using a high-frequency, high-accuracy clock.

Station 110A determines a count value to be programmed in a timer designed to count down (when enabled) from an initial count. Station 110A is designed to power-ON the powered-down circuit portions when the count reaches zero. The speed with which the count-down of the timer occurs is determined by an input clock. When in the sleep mode, the input clock is a low-frequency clock to enable reduction in power consumption. Station 110A initially determines an 'uncorrected' count value based on the clock frequency of the low-frequency clock. Ideally, with the uncorrected count value programmed in the timer, the timer would expire (reach a count of zero) at the desired time instant t33, coinciding with the start of the corresponding beacon transmission. However, due to the inherent low-accuracy of the low-frequency clock, the timer may expire earlier (e.g., at t32) or later (e.g., at t34) than the ideal instant of t33. Therefore, station 110A corrects the uncorrected count value to compensate for the inherent inaccuracy of the low-frequency clock.

Figure 4A:
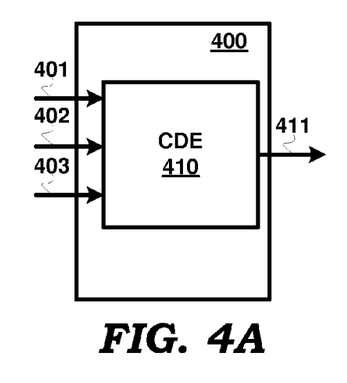
FIG. 4A is a diagram showing a clock drift estimator contained in a wireless station, in an embodiment.
Figure 4B:
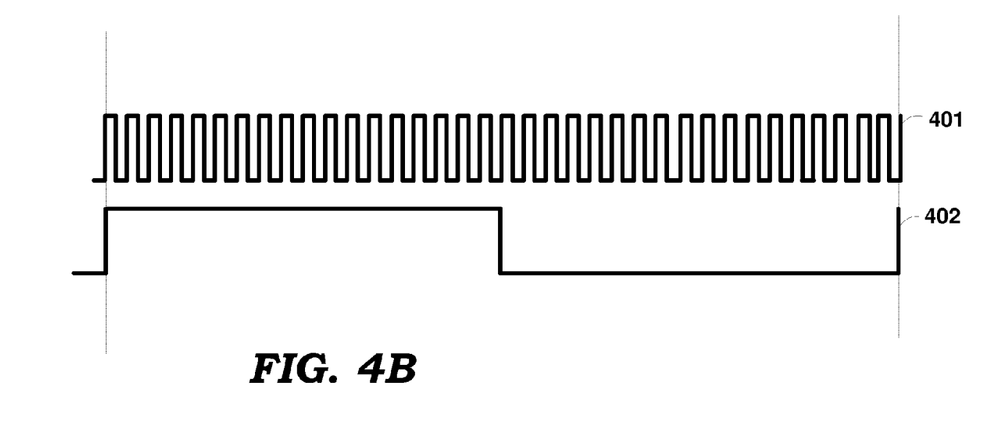
FIG. 4B is a diagram showing the number of cycles of a high frequency clock used in a wireless station that are contained in one cycle of a low-frequency clock used in the wireless station.

In an embodiment, station 110A is implemented to contain a hardware block designed to estimate an error between the low-frequency clock and the high-frequency clock. The hardware block is termed a clock drift estimator (CDE 410 in FIG. 4A). CDE 410 may be implemented within a processor (marked as 400 in FIG. 4A) contained in station 110A or as a separate hardware component that can communicate with the processor. CDE 410 receives as inputs the high frequency clock 401, the low-frequency clock 402, and a number (path 403) that specifies the ideal/expected number of cycles of the high-frequency clock 401 in one cycle of the low-frequency clock 402. The number provided as input on path 403 may be computed, for example, during calibration operations. FIG. 4B shows example waveforms of the low-frequency and the high frequency clocks. The specific number (thirty six) of clock cycles of signal 401 in one clock period of clock 402 is shown merely by way of illustration. In the example, thirty six is the ideal/expected ratio of clock cycles if low-frequency clock were not to have any error or drift with respect to the high-frequency clock (which is deemed to be sufficiently accurate).

However, due to inaccuracies and drift (for example, due to variations in operating conditions, ageing of components, etc.) in the frequency of low-frequency clock 402, the number of cycles of high-frequency clock 402 in one cycle of low-frequency clock 401 can be greater or less than thirty six. CDE 410 is in a power-ON state in awake intervals, and is designed to continuously (during awake intervals) monitor the frequencies of clocks 401 and 402 and to generate an error value on path 411. The error value could, for example, be provided in terms of a number of cycles of high-frequency clock 401. Station 110A reads the error (411) immediately prior to going in the sleep mode (e.g., slightly earlier than t31), and computes a corrected count value to be programmed in the timer. With the corrected value, station 110A wakes-up at t33 (or at least closer to t33 than t32 or t34), i.e., station 110A powers-ON the powered-down circuit portions at t33. With the correction done as described above, station 110A wakes up at the ideal desired instant of t33, thereby reducing power consumption that might otherwise have been entailed.

In another embodiment of the present invention, the uncorrected value (rather than the corrected value as noted above) of the count is entered as the initial count in the timer immediately prior to t31. On expiry of the count, only the processor core in station 110A is powered-ON, while the radio portions (transmitter and receiver) continue to be powered-down. Due to the inherent inaccuracy in the timer when operating using the low-frequency clock, the processor core may wake up later than (e.g., at t34) or earlier than (e.g., at t32) the ideal desired wake-up instant of t33. On waking up, the processor core (processing block 810 of FIG. 8, described below), computes the elapsed time based on how many cycles of the low-frequency clock have occurred between t31 and the 'current' time instant. The processor core then adds the time value saved just prior to entering sleep mode (i.e., immediately before t31) to the elapsed time to obtain the 'current' time value. The current time value thus computed may be in error due to the error in the elapsed time.

Based on the error 411 obtained from CDE 410, the processor core corrects the current time value to obtain a corrected current time value. If the corrected current time value is earlier than t33, the processor core powers-ON the radio portions at t33. The time needed to wait is obtained by subtracting time instant t33 from the corrected current time. On the other hand, if the corrected current time is later then t33, the processor core powers-ON the radio portions only at the start of the next beacon transmission at t35. The processor core could go to sleep or perform other tasks while waiting for the timer to expire.

As an example, assume that two thousand (2000) was entered as the initial count value in the timer. Hence, the timer expires (reaches a count of zero) after two thousand cycles of the low-frequency clock, and the processor core (processor) wakes. The processor then computes the time elapsed in the low-power mode. The time elapsed in the low-power mode corresponds to two thousand cycles of the low-frequency clock. For simplicity, assume that the period of the low-frequency clock equals one millisecond (1 ms). Thus, according to the low-frequency clock 2000 ms have elapsed since t31. However, the value of 2000 ms may be in error.

Assume that the expected/ideal ratio of the frequencies of the low-frequency clock and the high-frequency clock is 1/100. The expected value programmed as input on path 403 is therefore 100. Processor reads error 411 from CDE 410. Assume further that the low-frequency clock is slower than it should be, and that for 10 cycles of the of the low-frequency clock on path 402, CDE 410 obtains 1024 cycles of the high-frequency clock on path 401. The error therefore is +2.4, i.e., there are 2.4 additional cycles of the high-frequency clock. Thus, for the 2000 cycles of the low-frequency clock, there should be an additional 4800 cycles of the high frequency clock, and the elapsed time in terms of the number of cycles of the high-frequency clock is (200000+4800), which equals 204800.

The processor adds the time value saved just prior to entering sleep mode (i.e., immediately before t31) to the (correct) elapsed time as computed above to obtain the 'current' time value, and performs the operations to power-up the radio portions as described above.

According to another aspect of the present disclosure, errors between clocks of AP 110F and station 110A are compensated for to enable reduction of power consumption in station 110A, as described next.

4. Compensating for Errors Between Clocks of an AP and a Wireless Station

Figure 5:
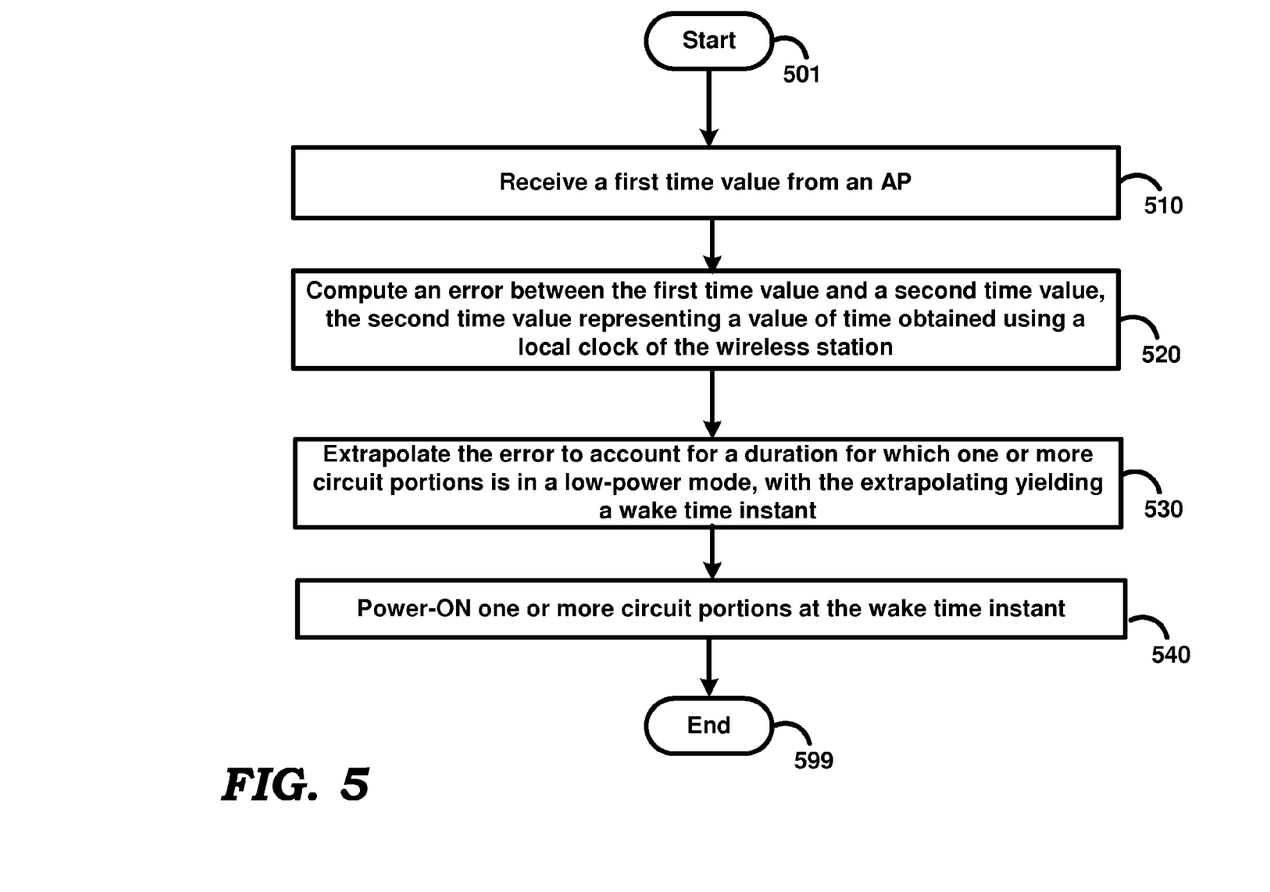
FIG. 5 is a flowchart illustrating the manner in which errors between clocks of an AP and a wireless station are compensated for to reduce power consumption in the wireless station, in an embodiment.

FIG. 5 is a flowchart illustrating the manner in which errors between clocks of an AP and a wireless station are compensated for to reduce power consumption in the wireless station, in an embodiment. The flowchart is described with respect to the environment of FIG. 1, and in relation to station 110A, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 501, in which control passes immediately to step 510.

In step 510, station 110A receives a first time value from AP 110F. The first time value (or first time stamp) may be contained in a beacon transmitted by AP 110F. Control then passes to step 520.

In step 520, station 110A computes an error between the first time value and a second time value. The second time value represents a value of time obtained using a local clock of the wireless station. Control then passes to step 530.

In step 530, station 110A computes a wake time instant. The computation of the wake time instant includes extrapolating the error to account for a duration for which one or more circuit portions in station 110A is/are to be in the low-power mode. Control then passes to step 540.

In step 540, station 110A powers-ON the one or more circuit portions at the wake time instant. Control then passes to step 599, in which the flowchart ends.

There may be a difference in the values of time as maintained by a local clock in station 110A and by AP 110F due to various reasons. According to the IEEE 802.11 standards, a frequency error of 0.01% is allowed in the clocks that maintain time in each of AP 110F and station 110A. Thus, a maximum worst-case frequency error between the clocks maintained in AP 110F and station 110A is 0.02%. As an example, one beacon period according to the IEEE 802.11 standard equals 102400 microseconds (μs), and a 0.02% error corresponds to an error of 20.48 μs per beacon period, i.e., in one beacon period duration the difference in time as maintained by AP 110F and station 110A is 20.48 μs. The error (difference in time as indicated by the clock of AP 110F and station 110A) increases with time. As an example, the worst case error between the time as maintained in AP 110F and time as maintained in station 110A is 20.48 μs (microseconds) after one beacon period (assuming a 0.02% accuracy error at the start of the beacon period). After five seconds, the error is 1 ms (millisecond). After sixty seconds, the error is 12 ms.

Figure 6:
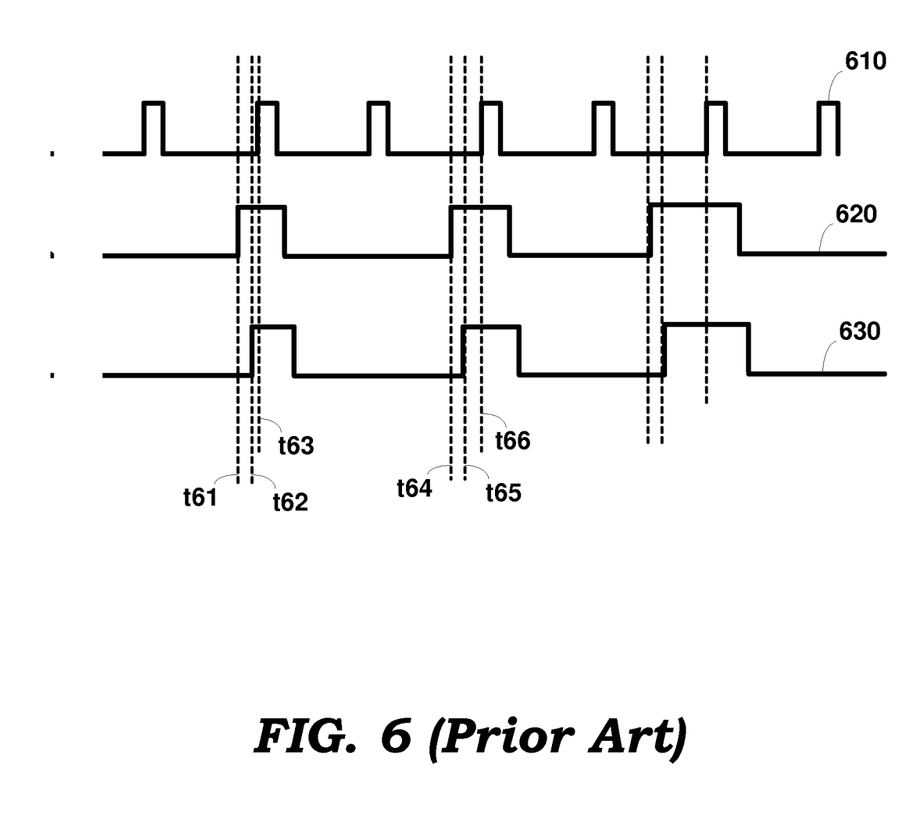
FIG. 6 is a timing diagram illustrating the wake time instants of a wireless station in a prior embodiment.

In a prior technique, illustrated with respect to FIG. 6, station 110A considers the worst case time error to determine when to power-ON the powered-down circuit portions. In FIG. 6, logic high durations of waveform 610 represent beacon transmission intervals of AP 110F. The logic high durations of waveform 620 represent awake intervals of station 110A, when the clock of station 110A is faster then the clock of AP 110F. The logic high durations of waveform 630 represent awake intervals of station 110A, when the clock of station 110A is slower then the clock of AP 110F. It is assumed that station 110A is designed to wake up only at every alternate beacon transmission. Time instants t63, t66 and t69 represent the ideal wake-up time instants of station 110A.

However, to account for the worst case time difference (error) between the time maintained in station 110A and the time maintained in AP 110F, and to ensure that a beacon transmission is never missed, station 110A may be designed to wake up at either t61 or t62. Instant t61 represents the wake-up time instant when the clock of station 110A is faster than that of AP 110F, with interval t63-t61 representing the worst case time error between the clocks of AP 110F and station 110A. Instant t62 represents the wake-up time instant when the clock of station 110A is slower than that of AP 110F, with interval t63-t62 representing the worst case time error between the clocks of AP 110F and station 110A. In either case, although station 110A ensures that a beacon transmission is not missed, station 110A always wakes up earlier than the ideal wake-up instant of t63, thereby wasting power.

If the error between the clocks of AP 110F and station 110A is not corrected, the actual time difference as computed based on the clocks of AP 110F and station 110A continues to increase. Thus, the next wake-up instant (assuming the clock of station 110A is faster than that of AP 110F) t64 is much earlier from t66 than t61 is from t63. Assuming that the clock of station 110A is slower than that of AP 110F, station 110A wakes up at t65, interval t65-t66 being longer than interval t62-t63. Thus, it may be appreciated that as time progresses, without correction of the error between the clocks of AP 110F and station 110A, station 110A wakes up progressively earlier than the ideal wake-up time instant, thereby resulting in power wastage.

According to an aspect of the present invention, the difference between the clocks of AP 110F and station 110A is corrected in each awake interval of station 110A (typically immediately prior to going into sleep mode). Further, the error is extrapolated to account for the time interval for which station 110A is to be in the sleep mode before waking up next. The extrapolation involves multiplying the error value by the sleep interval (i.e., the interval for which station 110A is to be in the sleep mode with corresponding circuit portions set to low-power mode). The product of the error value and the sleep interval added to or subtracted from the local time extrapolated for the sleep interval provides the time instant at which station 110A is to wake up, as described below with respect to an example. A corresponding count value is programmed in a count-down timer (similar to that noted above), and at the expiry of the count (i.e., when the count reaches zero), station 110A powers-ON the corresponding circuit portions.

In an embodiment, the wake-up time instant is computed as follows:

$$\text{Drift} = \text{tsfAP} - \text{tsfSTA1} \qquad \text{Equation 1}$$

wherein, tsfAP is the time value obtained from the timestamp field in a beacon transmitted by AP 110F, $$\text{tsfSTA1} = [\text{tsfSTA} - (\text{Rx Path Delay} + \text{MAC Processing delay} + \text{Air Prop delay})] \qquad \text{Equation 2}$$

wherein,

Rx Path Delay is the delay from the time the beacon reaches antenna of station 110A to the time it reaches MAC interface, i.e., the time delay through the signal processing circuits of receiver till it reaches software.

MAC Processing delay is the time delay from the time beacon timestamp reaches PHY→MAC interface to the time where the software in station 110A reads the time value for drift calculation, Air Prop Delay is the delay from the time beacon is on air at antenna of AP 110F to the time when the beacon reaches the antenna of station 110F, and tsfSTA=Time value in station 110A at the time of drift computation (equation 1)

A positive value of drift (Equation 1) means that the clock of station 110A is slower relative to the clock of AP 110F, and therefore the drift should be added to station 110A's time value to find the wake up time for beacon reception. A negative value of drift means the clock of station 110A is faster relative to the clock of AP 110F, and therefore the drift should be subtracted from station 110A's time value to find the wake up time for beacon reception.

The drift computed according to Equation 1 is extrapolated by the duration for which station 110A is to be in the sleep mode (an interval of two beacon periods in the example of FIG. 7), and added to or subtracted from the local time also extrapolated for the sleep interval, to obtain the time instant at which station 110A is to wake up. To illustrate with respect to FIG. 7, which shows example waveforms of power-on/power-down of station 110A, the drift may be computed sometime immediately prior to t74 (end of beacon transmission from AP 110F). Station 110A then multiplies the computed drift value with the period for which station 110A is to subsequently be set in the low-power/sleep mode. In the example, the sleep period equals two beacon periods.

Figure 7:
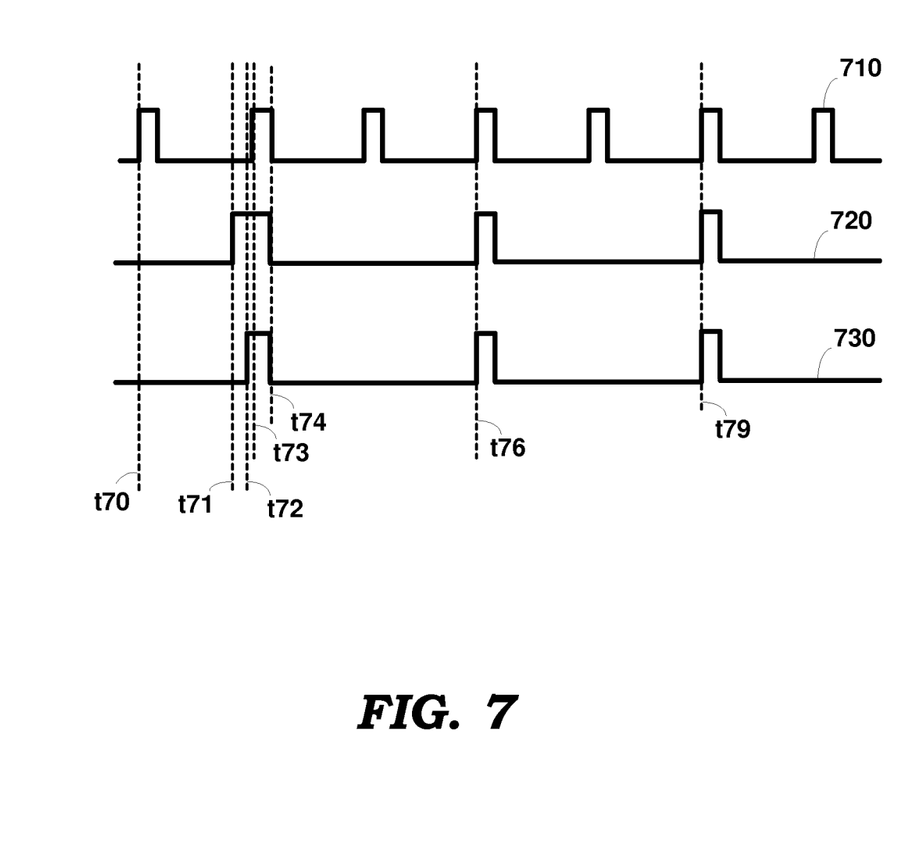
FIG. 7 is an example timing diagram illustrating wake time instants of a wireless station with errors between clocks of an AP and the wireless station being compensated for to reduce power consumption in the wireless station.

To begin with (e.g., after power-ON and when station 110A has not yet received any beacon from AP 110F, as at t70 of FIG. 7), when the actual drift (i.e., error between time as maintained by AP 110F and station 110A) is not known, station 110A may use the maximum theoretical drift to wake up for beacon reception (at t71 or t72 depending on whether the clock of station 110A is respectively faster than or slower than the clock of AP 110F). However after receipt of the first beacon (e.g., starting at t73 in FIG. 7), station 110A can compute actual drift between the clocks of station 110A and AP 110F, and extrapolate the drift to correctly compute the next wake-up instant (t76). Station 110A similarly computes the correct wake-up time instance (such as t79) for all future awake intervals. The correction of the error between the clock of AP 110F and the clock of station 110A and the extrapolation is performed each time station 110A is awake (i.e., in each awake interval). Due to such correction, power consumption in station 110A is reduced.

To illustrate with an example, assuming time starts from t70, i.e., time at t70 is zero seconds (0 s), time at t73 equals 102400 µs, the interval from t70 to t73 being one beacon period which is 102400 µs according to IEEE 802.11 standards. However, the clock of station 110A being fast, the time maintained by station 110A at t73 may, as an example, indicate 102410 µs, with an error therefore of (−10 µs). Station 110A therefore multiplies the error 10 by the sleep interval of 2 (2 beacon periods) and subtracts the product from the value (102410*2), which is the local time extrapolated by the sleep interval to obtain a time value of [(2*102410)−(2*10)] µs, wherein '*' represents a multiplication operation. With respect to FIG. 7, the value [(2*102410)−(2*10)] µs corresponds to the interval t76-t73. Station 110A programs a count corresponding to the value [(2*102410)−(2*10)] µs in a timer to wake up at t76. The duration t73-t74 (or a beacon transmission interval of AP 110F, in general) is considered negligible and ignored in the computations above.

The implementation details of station 110A in an embodiment are described next.

4. Wireless Station

Figure 8:
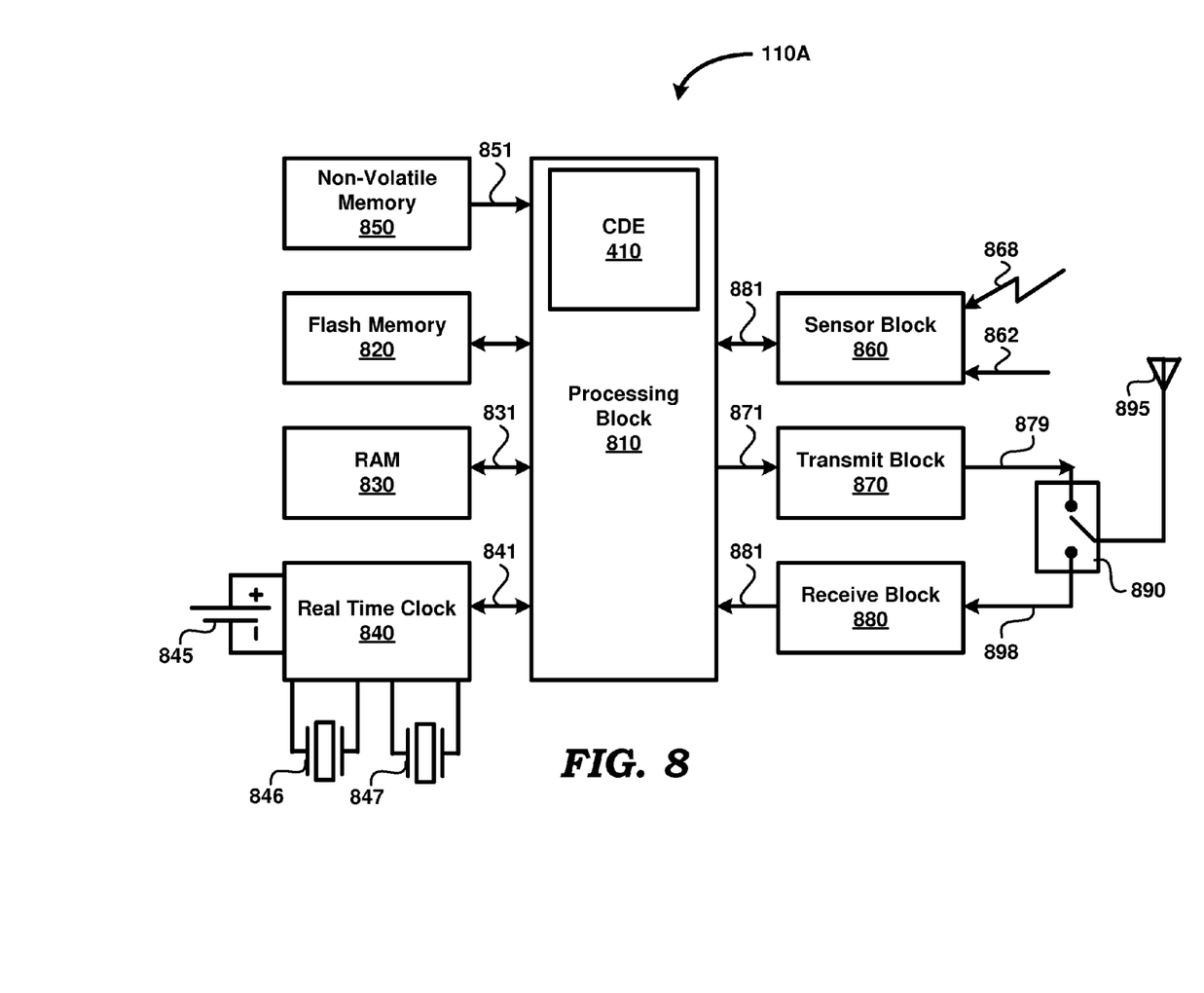
FIG. 8 is a block diagram of the implementation details of a wireless station in an embodiment The drawing in which an element first appears is indicated by the leftmost digit(s) in the corresponding reference number.

FIG. 8 is a block diagram of the implementation details of a wireless station in an embodiment. Station 110A is shown containing processing block 810, flash memory 820, RAM 830, real-time clock (RTC) 840, battery 845, crystals 846 and 847, non-volatile memory 850, sensor block 860, transmit block 870, receive block 880, switch 890 and antenna 895. The whole of station 110A may be implemented as a system-on-chip (SoC), except for battery 845, crystals 846 and 847 and antenna 895. Alternatively, the blocks of FIG. 8 may be implemented on separate integrated circuits (IC). Clock drift estimator (CDE) is shown contained within processing block 810. The inputs and outputs of CDE 410 are not shown in FIG. 8, and are assumed to be present.

The specific components/blocks of station 110A are shown merely by way of illustration. However, station 110A may contain more or fewer components/blocks. Further, although not shown in FIG. 8, all blocks of station 110A may be connected automatically to an auxiliary power source (such as battery 845) in the event of failure of main power source (not shown).

Sensor block 860 may contain one or more sensors, as well as corresponding signal conditioning circuitry, and provides on path 861 measurements/values of physical quantities such as temperature, pressure, etc., sensed via wired path 862 or wireless path 868.

Antenna 895 operates to receive from and transmit to a wireless medium corresponding wireless signals containing data. Switch 890 may be controlled by processing block 810 (connection not shown) to connect antenna 895 either to receive block 880 via path 898, or to transmit block 870 via path 879, depending on whether end device 800 is to receive or transmit.

Transmit block 870 receives data (to be transmitted via antenna 895) on path 871 from processing block 810, generates a modulated radio frequency (RF) signal according to IEEE 802.11 standards, and transmits the RF signal via switch 890 and antenna 895. Receive block 880 receives an RF signal bearing data (e.g., beacons) via switch 890 and antenna 895, demodulates the RF signal, and provides the extracted data to processing block 810 on path 881. The extracted data includes time stamps contained in beacons transmitted by AP 110F. The combination of transmit block 870 and receive block 880 represents a radio circuit of station 110A.

RTC 840 operates as a clock, and provides the 'current' time to processing block 810 on path 841. RTC 840 may be backed-up by battery 845 (in addition to the normal source of power, not shown in the Figure). RTC 840 may also contain memory to store critical information received from processing block 810. Although not shown as such in FIG. 8, battery 845 may also be used as back-up power to one or more of the other components/blocks of station 800. Thus, for example, the power supply to flash memory 820 may be automatically switched (by corresponding circuitry not shown) to battery 845 in case of failure of the main power source (not shown).

RTC 840 contains two sets of clock circuitry, one using crystal 846, and operating as a low-frequency clock, and the another using crystal 847 and operating as a high-frequency clock. Alternatively, a RTC 840 may contain only one circuitry with one of crystals 846 and 847 being selectively connected to it. Processing block 810 may control RTC 840 to maintain time by using the low-frequency clock during sleep intervals, with the high frequency clock being switched off during the sleep intervals. During awake intervals, RTC 840 employs the high-frequency clock to maintain time, and the low-frequency clock may not be operational. RTC 840 also includes one or more timers/counters which may be selectively operated based on either the low-frequency clock or the high-frequency clock.

Non-volatile memory 850 stores instructions, which when executed by processing block 810, causes station 110A to provide several desired features noted herein. In particular, non-volatile memory 850 includes instructions and data to enable station 110A to correct for clock errors and to thereby enable reduction in power consumption. RAM 830 may be used to store data and temporary variables required for processing block 810 to provide desired features. In particular, instructions and data representing the software modules and variables for enabling correction of clock errors may be copied by processing block 810 from non-volatile memory 850 to RAM 830 (in general, volatile memory 830) for execution/operation.

RAM 830 and non-volatile memory 850 constitute computer program products or machine/computer readable media, which are means for providing instructions to processing block 810. Processing block 810 may contain multiple processing units internally, with each processing unit potentially being designed for a specific task. Alternatively, processing block 810 may contain only a single general-purpose processing unit.

5. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of operating a wireless station, said method comprising:
  powering-down a portion of said wireless station, wherein said portion comprises a radio circuit and a processor;
  setting a timer to a first value computed based on an error between a low-frequency clock and a high-frequency clock; and
  powering up said portion upon expiry of said timer,
  wherein said timer is operated using a high-frequency clock in awake intervals when said portion is powered up, but is operated using a low-frequency clock when said portion is powered down,
  said method further comprising receiving a beacon from an access point (AP), wherein powering up based on said error ensures that said beacon is received when said radio circuit is powered up,
  wherein said processor is also powered down along with said radio circuit, said method further comprising:
    identifying, using said processor when powered up, a future time instance at which said beacon is expected to be received;
    initializing said timer to a second value upon powering down of both of said processor and said radio circuit, wherein said second value corresponds to an ideal duration at which a beacon transmission is expected to start;
    powering up only said processor, at a first time instance, when said timer initialized to said second value expires;
    using said processor, upon being powered up at said first time instance, determining whether said future time instance has already occurred or not;
    if said future time instance has already occurred:
      computing again a next future time instance at which said beacon is expected to be received;
      maintaining said radio circuit in said powered down mode until said next future time instance and powering up said radio circuit immediately thereafter; and
      continuing operation of said processor using said high frequency clock until said next future time instance;
    if said future time instance has not already occurred:
      computing a difference value corresponding to a duration from a present time instance to said future time instance, wherein said duration is proportionate to said error between said low-frequency clock and said high frequency clock,
  wherein said difference value is used as said first value in said setting of said timer.

2. The method of claim 1, further comprising:
  determining said error based on a difference of a ratio of the frequencies of said high frequency clock and said low frequency clock from an expected ideal ratio,
  wherein said setting stores a corrected value as said first value, said corrected value equaling an ideal value corresponding to said expected ideal ratio corrected by an error value proportionate to said error.

3. The method of claim 2, wherein said processor is used for processing said beacon and also for performing said setting.

4. The method of claim 1, wherein each of said AP and said wireless station is comprised in an infrastructure basic service set (BSS) according to IEEE 802.11 standards.

5. A wireless station designed to set one or more circuit portions comprised in said wireless station in a low-power mode between awake intervals, wherein said wireless station is designed to receive beacons from an access point (AP) in awake intervals, said wireless station comprising:
  a processor;
  a radio circuit operating as a transceiver to transmit and receive signals over a wireless medium; and
  a machine readable medium storing one or more sequences of instructions, wherein execution of said one or more sequences of instructions by said processor causes said processor to perform the actions of:
  powering-down a radio circuit of said wireless station;
  setting a timer to a first value computed based on an error between a low-frequency clock and a high-frequency clock;
  powering up said radio circuit upon expiry of said timer, wherein said timer is operated using a high-frequency clock in awake intervals when said portion is powered up, but is operated using a low-frequency clock when said portion is powered down; and
  receiving a beacon from an access point (AP), wherein powering up based on said error ensures that said beacon is received when said radio circuit is powered up,
  wherein a processor of said wireless station is also powered down along with said radio circuit, said method further comprising:
    identifying, using said processor when powered up, a future time instance at which said beacon is expected to be received;
    initializing said timer to a second value upon powering down of both of said processor and said radio circuit, wherein said second value corresponds to an ideal duration at which a beacon transmission is expected to start;
    powering up only said processor, at a first time instance, when said timer initialized to said second value expires;
    using said processor, upon being powered up at said first time instance, determining whether said future time instance has already occurred or not;
    if said future time instance has already occurred:
      computing again a next future time instance at which said beacon is expected to be received;
      maintaining said radio circuit in said powered down mode until said next future time instance and powering up said radio circuit immediately thereafter; and
      continuing operation of said processor using said high frequency clock until said next future time instance;
    if said future time instance has not already occurred:
      computing a difference value corresponding to a duration from a present time instance to said future time instance, wherein said duration is proportionate to said error between said low-frequency clock and said high frequency clock,
  wherein said difference value is used as said first value in said setting of said timer.

6. The wireless station of claim 5, wherein each of said AP and said wireless station is comprised in an infrastructure basic service set (BSS) according to IEEE 802.11 standards.

7. A non-transitory machine readable storage medium storing one or more sequences of instructions for operating a wireless station, wherein execution of said one or more sequences of instructions by one or more processors contained in said computing system causes said wireless system to perform the actions of:

powering-down a portion of said wireless station, wherein said portion comprises a radio circuit and a processor of said one or more processors;

setting a timer to a first value computed based on an error between a low-frequency clock and a high-frequency clock; and powering up said portion upon expiry of said timer, wherein said timer is operated using a high-frequency clock in awake intervals when said portion is powered up, but is operated using a low-frequency clock when said portion is powered down, said actions further comprising receiving a beacon from an access point (AP), wherein powering up based on said error ensures that said beacon is received when said radio circuit is powered up, wherein said processor is also powered down along with said radio circuit, said method further comprising:

identifying, using said processor when powered up, a future time instance at which said beacon is expected to be received;

initializing said timer to a second value upon powering down of both of said processor and said radio circuit, wherein said second value corresponds to an ideal duration at which a beacon transmission is expected to start;

powering up only said processor, at a first time instance, when said timer initialized to said second value expires;

using said processor, upon being powered up at said first time instance, determining whether said future time instance has already occurred or not;

if said future time instance has already occurred:

computing again a next future time instance at which said beacon is expected to be received;

maintaining said radio circuit in said powered down mode until said next future time instance and powering up said radio circuit immediately thereafter; and continuing operation of said processor using said high frequency clock until said next future time instance;

if said future time instance has not already occurred:

computing a difference value corresponding to a duration from a present time instance to said future time instance, wherein said duration is proportionate to said error between said low-frequency clock and said high frequency clock, wherein said difference value is used as said first value in said setting of said timer.

8. The non-transitory machine readable storage medium of claim 7, said actions further comprising:

determining said error based on a difference of a ratio of the frequencies of said high frequency clock and said low frequency clock from an expected ideal ratio, wherein said setting stores a corrected value as said first value, said corrected value equaling an ideal value corresponding to said expected ideal ratio corrected by an error value proportionate to said error.

9. The non-transitory machine readable storage medium of claim 8, wherein said processor is used for processing said beacon and also for performing said setting.

10. The non-transitory machine readable storage medium of claim 7, wherein each of said AP and said wireless station is comprised in an infrastructure basic service set (BSS) according to IEEE 802.11 standards.

* * * * *